United States Patent
Dell'Orto et al.

(10) Patent No.: US 12,341,565 B2
(45) Date of Patent: Jun. 24, 2025

(54) TESTING SYSTEM FOR HIGH-FREQUENCY MODULATORS

(71) Applicant: LUMENTUM TECHNOLOGY UK LIMITED, Northamptonshire (GB)

(72) Inventors: Flavio Dell'Orto, Desio (IT); Marco Villa, Cabiate (IT)

(73) Assignee: Lumentum Operations LLC, San Jose, CA (US)

( * ) Notice: Subject to any disclaimer, the term of this patent is extended or adjusted under 35 U.S.C. 154(b) by 273 days.

(21) Appl. No.: 18/129,549

(22) Filed: Mar. 31, 2023

(65) Prior Publication Data

US 2024/0259117 A1 Aug. 1, 2024

Related U.S. Application Data

(60) Provisional application No. 63/481,764, filed on Jan. 26, 2023.

(51) Int. Cl.
  *H04B 17/13* (2015.01)
  *H04B 17/10* (2015.01)
  *H04B 17/20* (2015.01)

(52) U.S. Cl.
  CPC ........... *H04B 17/102* (2015.01); *H04B 17/13* (2015.01); *H04B 17/202* (2023.05)

(58) Field of Classification Search
  CPC .... H04B 17/13; H04B 17/102; H04B 17/202; H04B 17/0085; H04B 10/50; G01N 21/636; G01N 21/1702
  See application file for complete search history.

(56) References Cited

U.S. PATENT DOCUMENTS

| | | | | |
|---|---|---|---|---|
| 8,842,992 B2* | 9/2014 | Middleton | ............. | H04B 10/00 398/208 |
| 11,824,587 B1* | 11/2023 | Chaffee | .............. | H04B 10/1121 |
| 2008/0175593 A1* | 7/2008 | Li | ..................... | H04B 10/25758 398/116 |
| 2009/0103924 A1* | 4/2009 | Kawanishi | .............. | H04L 27/04 398/118 |
| 2012/0141135 A1* | 6/2012 | Yang | ....................... | H04J 14/06 398/140 |
| 2021/0364419 A1* | 11/2021 | Allred | .................. | G01N 21/636 |

OTHER PUBLICATIONS

John Bainbridge, et al.; "OIF Dual Polarisation QPSK Modulator Component Test Methods"; Sep. 6, 2013; pp. 1-99; Ciena.

* cited by examiner

*Primary Examiner* — Tung X Le
(74) *Attorney, Agent, or Firm* — Harrity & Harrity, LLP

(57) ABSTRACT

A testing system for a modulator includes a radio frequency (RF) generator, an optical power meter, and an electrical power meter. The RF generator is configured to generate and provide a first plurality of RF signals and a second plurality of RF signals, wherein the first plurality of RF signals and the second plurality of RF signals are associated with a plurality of frequencies. The optical power meter is configured to measure an optical power of an output optical signal, which is modulated by the modulator based on the first plurality of RF signals, to facilitate determination of a transmission response measurement of the modulator for each frequency of the plurality of frequencies. The electrical power meter is configured to measure a portion of each RF signal of the second plurality of RF signals to facilitate determination of a reflectance response measurement of the modulator for each frequency.

20 Claims, 5 Drawing Sheets

TESTING SYSTEM FOR HIGH-FREQUENCY MODULATORS

CROSS-REFERENCE TO RELATED APPLICATION

This patent application claims priority to U.S. Provisional Patent Application No. 63/481,764, filed on Jan. 26, 2023, and entitled "TESTING SYSTEM FOR HIGH FREQUENCY MODULATOR." The disclosure of the prior application is considered part of and is incorporated by reference into this patent application.

TECHNICAL FIELD

The present disclosure relates generally to a testing system and to a testing system for a high-frequency modulator.

BACKGROUND

A vector network analyzer (VNA) is a test instrument that can be used with a detector (e.g., a photodiode, such as a high frequency photodiode) to measure a performance of a device, such as an optical modulator. The VNA can test an optical modulator to determine its reflection and transmission properties as a function of frequency. For example, the VNA can determine a reflection coefficient (S11) and a transmission coefficient (S21) of the optical modulator.

SUMMARY

In some implementations, a testing system to test a modulator includes a radio frequency (RF) generator; an optical power meter; and a controller, wherein: the RF generator is configured to generate and provide a plurality of RF signals, wherein the plurality of RF signals are associated with a plurality of frequencies; the optical power meter is configured to measure an optical power of an output optical signal emitted by the modulator, wherein the output optical signal is modulated by the modulator based on the plurality of frequencies; the optical power meter is configured to provide, based on measuring the optical power of the output optical signal, one or more optical power measurements associated with each frequency of the plurality of frequencies, and the controller is configured to: determine, based on the one or more optical power measurements associated with each frequency of the plurality of frequencies, an average optical power associated with each frequency of the plurality of frequencies, and determine, based on the average optical power associated with each frequency of the plurality of frequencies, a transmission response measurement of the modulator for each frequency of the plurality of frequencies.

In some implementations, a testing system includes a testing component configured to hold a modulator; an RF generator; an optical power meter; and an electrical power meter, wherein: the RF generator is configured to generate and provide a first plurality of RF signals in association with a first process, wherein the first plurality of RF signals are associated with a plurality of frequencies; the optical power meter is configured to measure an optical power of an output optical signal emitted by the modulator, wherein the output optical signal is modulated by the modulator based on the plurality of frequencies; the RF generator is configured to generate and provide a second plurality of RF signals in association with a second process, wherein the second plurality of RF signals are associated with a plurality of frequencies; and the electrical power meter is configured to measure a portion of each RF signal of the second plurality of RF signals.

In some implementations, a method includes identifying, by a controller of a testing system for a modulator, a maximum value and a minimum value of an optical transfer function that is associated with the modulator; causing, by the controller, the modulator to be biased with a particular voltage that is associated with one of the maximum value or the minimum value of the optical transfer function; and causing, by the controller, an RF generator of the testing system to generate and provide a plurality of RF signals, wherein the plurality of RF signals are associated with a plurality of frequencies.

DETAILED DESCRIPTION

Figure 1:
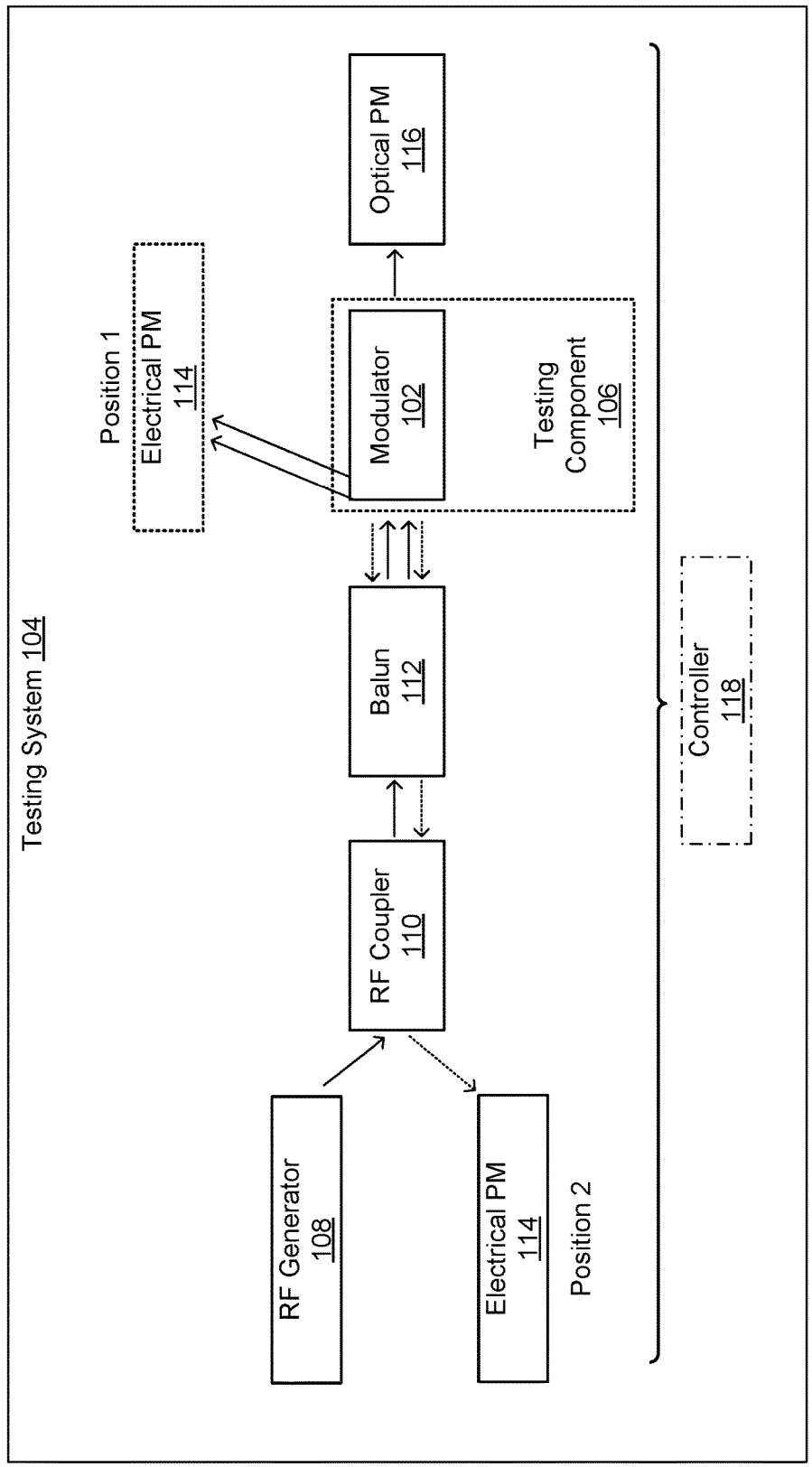
FIG. 1 is a diagram of an example implementation described herein.

The following detailed description of example implementations refers to the accompanying drawings. The same reference numbers in different drawings may identify the same or similar elements.

A VNA comprises several components that work together to facilitate testing of an optical modulator. For example, a VNA typically includes a signal source (e.g., an electrical oscillator that generates electrical signals with different frequencies), a detector (e.g., a photodiode that measures an optical power of an optical signal that is modulated by the optical modulator based on the electrical signals generated by the electrical source), and a processor (e.g., that determines, based on measurements of the detector, reflection and transmission properties of the optical modulator as a function of frequency). When the modulator is a high-frequency modulator (e.g., that supports modulation of greater than or equal to 70 gigahertz (GHz)), the components of the VNA need to be able to support generating high-frequency electrical signals, detecting high-frequency optical signals, and/or processing related high-frequency data. This increases a complexity, and cost, of the components (e.g., to assemble, use, and/or maintain the components in the VNA). Further, when facilitating high-frequency testing, the components have an increased likelihood of being affected by high-frequency noise, which impacts an accuracy of the VNA's analysis of an optical performance of the optical modulator.

Some implementations described herein provide a testing system that is configured to test a modulator (e.g., an optical modulator). The testing system includes an RF generator, an optical power meter, an electrical power meter, and/or a controller. The RF generator is configured to generate and provide a plurality of RF signals that are associated with a plurality of frequencies (e.g., that includes frequencies greater than or equal to 70 GHz). The plurality of RF signals may be used to facilitate testing one or more optimal performance characteristics of the modulator, such as transmission response measurement and/or reflectance response measurement.

For example, the modulator may modulate an input optical signal based on the plurality of RF signals to generate an output optical signal (e.g., a modulated output optical signal). The optical power meter measures an optical power of the output optical signal, and provides, to the controller, one or more optical measurements associated with each frequency of the plurality of frequencies. The controller thereby determines an optical power (e.g., an average optical power) associated with each frequency of the plurality of frequencies. This allows the controller to determine (e.g., based on an optical transfer function associated with the modulator) a transmission response measurement (e.g., an electro-optic efficiency over frequency measurement, which may be similar to an S21 measurement) of the modulator for each frequency of the plurality of frequencies.

As another example, the testing system may further include an RF coupler (e.g., that is configured to provide the plurality of RF signals from the RF generator to the modulator). The electrical power meter measures an electrical power of a portion (e.g., a portion that is reflected by the modulator) of each RF signal, of the plurality of RF signals, at an input of the RF coupler. The electrical power meter provides, to the controller, electrical power measurements of the portions of the plurality of RF signals to allow the controller to determine an electrical power (e.g., an average electrical power) associated with each frequency of the plurality of frequencies. This then allows the controller to determine a reflectance response measurement (e.g., an S11 measurement) of the modulator for each frequency of the plurality of frequencies.

In this way, the testing system described herein does not need to detect high-frequency optical signals and/or process related high-frequency data. For example, the testing system described herein includes low-frequency components, such as the optical power meter and the electrical power meter, that are able to obtain measurements at frequencies that are hundreds, thousands, or more, times less than a maximum frequency of the modulator. The controller can process these low-frequency measurements to determine one or more high-frequency optimal performance characteristics of the modulator. Accordingly, a complexity, and cost, of the components of the testing system (e.g., to assemble, use, and/or maintain the components in the testing system) is reduced as compared to the components of a VNA. Additionally, because low-frequency components can be used to determine high-frequency optimal performance characteristics of the modulator, the testing system can determine such optimal performance characteristics based on higher electrical frequencies (e.g., greater than or equal to 200 GHz), for which optical frequency detection components are not practically available. Further, the components of the testing system are less likely to be affected by high-frequency noise, which therefore, in some cases, improves an accuracy of the testing system's analysis of an optical performance of the modulator as compared to that of a VNA.

FIG. 1 is a diagram of an example implementation 100 described herein. As shown in FIG. 1, example implementation 100 comprises a modulator 102 and a testing system 104. The testing system 104 may include a testing component 106, an RF generator 108, an RF coupler 110, a balun 112, an electrical power meter 114, an optical power meter 116, and/or a controller 118.

The modulator 102 may be an optical modulator, such as a Mach-Zehnder (MZ) modulator, and may comprise indium phosphide (InP), gallium arsenide (GaAs), lithium niobate (LN), silicon (Si) (e.g., in association with silicon photonics), a polymer, and/or another material. The modulator 102 may be configured to be a high-frequency modulator. That is, the modulator 102 may be configured to modulate an input optical signal (and thereby create an output optical signal that is modulated) at one or more frequencies that are greater than or equal to a high-frequency threshold. The high-frequency threshold may be, for example, greater than or equal to 70 GHz, 75 GHz, 80 GHz, 85 GHz, 90 GHz, 95 GHz, 100 GHz, 105 GHz, 110 GHz, 115 GHZ, 120 GHz, 125 GHz, 150 GHz, 175 GHz, 200 GHz, 225 GHz, or 250 GHz. Each of the input optical signal and the output optical signal may be, for example, a laser beam. In some implementations, the modulator 102 may include multiple channels. For example, the modulator 102 may include an in-phase channel, or "I" channel, and a quadrature (90 degree) phase channel, or "Q" channel.

The testing system 104 (e.g., using one or more components of the testing system 104) may be configured to test the modulator 102 (e.g., to test one or more frequency responses of the modulator 102, as described herein). The testing system 104 may be a high-frequency testing system. That is, the testing system 104 may be configured to test the modulator 102 (e.g., to test one or more frequency responses of the modulator 102) at one or more frequencies that are greater than or equal to the high-frequency threshold.

The testing component 106 may be configured to hold the modulator 102 (e.g., to allow the modulator 102 to be tested by the testing system 104). For example, the testing component 106 may include a jig, or one or more components, to hold the modulator 102 in a particular position while the modulator 102 is tested by the testing system 104. The testing component 106 may include one or more ports, one or more connectors, or other similar components that facilitate connection of the modulator 102 to one or more other components of the testing system 104, such as to the RF generator 108, the RF coupler 110, the balun 112, the electrical power meter 114, and/or the optical power meter 116. For example, the testing component 106 may include one or more components to allow a plurality of RF signals (e.g., that are generated by the RF generator 108) to be provided to the modulator 102 (e.g., to a particular channel of the modulator 102). In some implementations, the testing component 106 (or the modulator 102) may include a driver, such as a differential driver, to facilitate modulation of an optical signal by the modulator 102 (e.g., based on the plurality of RF signals).

The RF generator 108 may be configured to generate a plurality of RF signals (e.g., serially, such that a first RF signal is generated, and then a second RF signal is generated, and then a third RF signal is generated, and so on). Each RF signal may be a continuous wave (CW) RF signal. The plurality of RF signals may be associated with a plurality of frequencies, such that each RF signal is generated with a frequency of the plurality of frequencies (e.g., each RF signal is modulated at a frequency that is different than respective frequencies of other RF signals of the plurality of RF signals). For example, the RF generator 108 may generate a plurality of RF signals where each RF signal is associated with a particular (e.g., unique) frequency in a frequency range that is associated with the plurality of frequencies. The frequency range may be from a minimum frequency to a maximum frequency (e.g., greater than or equal to the minimum frequency and less than or equal to the maximum frequency). The minimum frequency may be, for example, greater than or equal to 0.1 GHz, 0.5 GHz, 1 GHz, 1.5 GHz, or 2 GHz, and the maximum frequency may be, for example, less than or equal to 115 GHz, 120 GHz, 125 GHz, 150 GHz, 175 GHz, 200 GHz, 225 GHz, or 250 GHz. The frequency range may include a maximum frequency that is greater than or equal to the high-frequency threshold described above, and therefore may be considered to be a "high-frequency" range. In a specific example, the RF generator 108 may generate a plurality of RF signals, at 1 GHz step intervals, from the minimum frequency to the maximum frequency. In some implementations, the RF generator 108 may include one or more components described herein in relation to FIG. 2.

The RF coupler 110 may include an input and an output, and may be configured to transmit RF signals received at the input of the RF coupler 110 to the output of the RF coupler 110 (e.g., within the RF coupler 110), and to thereby provide the RF signals to the modulator 102 (e.g., directly, or indirectly, such as via the balun 112). The balun 112 may include an input and an output, and may be configured to convert single-ended RF signals received at the input of the balun 112 to differential RF signals at the output of the balun 112, and to thereby provide the differential RF signals to the modulator 102. Each of the RF coupler 110 and the balun 112 may be optional components in the testing system 104.

The electrical power meter 114 may be configured to measure an electrical power of an RF signal, such as in watts (W) or decibel milliwatts (dBm). In some implementations, the electrical power meter 114 may be placed in a first position (shown as position 1 in FIG. 1) at an input of the testing component 106, such that the electrical power meter 114 is configured to measure an electrical power of an RF signal that is to be provided into the modulator 102. For example, the RF generator 108 may be configured to generate and to provide a plurality of RF signals that are associated with a plurality of frequencies (e.g., as described elsewhere herein) to an input of the testing component 106 (e.g., directly, or indirectly, such as via the coupler 110 and/or the balun 112). In some implementations, respective first portions of the plurality of RF signals (as indicated by the solid arrows shown in FIG. 1) may be transmitted to the input of the testing component 106, while respective second portions of the plurality of RF signals (as indicated by the dashed arrows shown in FIG. 1) may be reflected back from the modulator 102. Accordingly, the electrical power meter 114, when placed in the first position, may be configured to measure an electrical power of the first portion of each RF signal that transmits to the input of the testing component 106.

In this way, the electrical power meter 114 may obtain an electrical power measurement associated with each RF signal of the plurality of RF signals. The electrical power measurements associated with the plurality of RF signals may be used to facilitate determining a transmission response measurement (e.g., an electro-optic efficiency over frequency measurement, which may be similar to an S21 measurement) of the modulator 102 at each frequency of the plurality of frequencies that are associated with the plurality of RF signals, as further described herein. In some implementations, the electrical power meter 114 may be placed in the first position as part of a calibration process (e.g., to calibrate the testing system 104 before testing of a modulator 102), as further described herein.

In some implementations, the electrical power meter 114 may be placed in a second position (shown as position 2 in FIG. 1) at the input of the RF coupler 110, such that the electrical power meter 114 is configured to measure an electrical power of a portion of an RF signal that is reflected back (e.g., from the modulator 102) via the input of the RF coupler 110. For example, the RF generator 108 may be configured to generate and to provide a plurality of RF signals that are associated with a plurality of frequencies (e.g., as described elsewhere herein) to the input of the RF coupler 110. In some implementations, respective first portions of the plurality of RF signals (as indicated by the solid arrows shown in FIG. 1) may be transmitted by the RF coupler 110 to the modulator 102 (e.g., directly, or indirectly, such as via the balun 112), while respective second portions of the plurality of RF signals (as indicated by the dashed arrows shown in FIG. 1) may be reflected back from the modulator 102 to the RF coupler 110. The electrical power meter 114 may be configured to measure an electrical power of the second portion of each RF signal that reflects back from the modulator 102 and emits from the input of the RF coupler 110.

In this way, the electrical power meter 114, when placed in the second position, may obtain an electrical power measurement associated with each frequency of the plurality of frequencies (e.g., that are associated with the plurality of RF signals). The electrical power measurements associated with the plurality of frequencies may be used to determine a reflectance response measurement (e.g., an S11 measurement) of the modulator 102 at each frequency, as further described herein. In some implementations, the electrical power meter 114 may be placed in the second position as part of a reflection response determination process (e.g., to test reflectance characteristics of the modulator 102), as further described herein.

The optical power meter 116 may be configured to measure an optical power (e.g., a direct current (DC) optical power) of an output optical signal of the modulator 102, such as in W or dBm. For example, the modulator 102 may receive an input optical signal (e.g., from an optical signal source, which may, or may not, be included in the testing system 104) and may modulate the input optical signal (e.g., based on a plurality of RF signals generated by the RF generator 108 and provided to the modulator 102) to create an output optical signal (e.g., that is modulated in association with a plurality of frequencies that are associated with the plurality of RF signals). The optical power meter 116 may be configured to measure an optical power of the output optical signal as it emits from the modulator 102.

The optical power meter 116 may measure an optical power of the output optical signal one or more times while the output optical signal is modulated (or attempted to be modulated) by the modulator 102 in association with a particular RF signal, such as during a time window. The time window may be less than or equal to 1 second, 2 seconds, 3 seconds, 5 seconds, 10 seconds, 15 seconds, 20 seconds, 25 seconds, 30 seconds, or 1 minute, among other examples. Accordingly, the optical power meter 116 may obtain one or more optical power measurements associated with a particular frequency that is associated with the particular RF signal during the time window. A measurement frequency of the optical power meter 116 may be less (e.g., hundreds of times, thousands of times, or more, less) than the particular frequency, so a quantity of the one or more optical power measurements obtained during the time window may be less (e.g., hundreds of times, thousands of times, or more, less) than a quantity of times the output optical signal is modulated during the time window.

In this way, the optical power meter 116 may obtain one or more optical power measurements associated with each frequency of the plurality of frequencies (that are associated with the plurality of RF signals). The one or more optical power measurements respectively associated with the plurality of frequencies may be used to determine a transmission response measurement (e.g., an electro-optic efficiency over frequency measurement) of the modulator 102 at each frequency, such as part of a transmission response determination process (e.g., to test transmission characteristics of the modulator 102), as further described herein.

The controller 118 may be in communication (e.g., by a wired connection or a wireless connection) with one or more other components of the testing system 104, such as the testing component 106, the RF generator 108, the RF coupler 110, the balun 112, the electrical power meter 114, and/or the optical power meter 116. The controller 118 may be configured to control the one or more other components of the testing system 104. Additionally, or alternatively, the controller 118 may be configured to receive, transmit, process, generate, and/or provide information, as described elsewhere herein.

The controller 118 may be configured to determine one or more optical performance characteristics of the modulator 102, such as based on measurements of the electrical power meter 114 and/or on measurements of the optical power meter 116. For example, the controller 118 may determine one or more reflection response measurements (e.g., one or more S11 measurements) of the modulator 102 and/or one or more transmission response measurements (e.g., one or more electro-optic efficiency over frequency measurements) of the modulator 102.

In some implementations, such as part of a calibration process (e.g., when the electrical power meter 114 is in the first position), the controller 118 may communicate with the RF generator 108 to cause the RF generator to generate a plurality of RF signals that are associated with a plurality of frequencies, and to provide (e.g., directly, or indirectly, such as via the RF coupler 110 and/or the balun 112) the plurality of RF signals to the input of the testing component 106. The controller 118 may communicate with the electrical power meter 114 to cause the electrical power meter 114 to measure respective electrical powers of the plurality of RF signals (or of portions of the plurality of RF signals that have been transmitted to the input of the testing component 106). Accordingly, the electrical power meter 114 may obtain electrical power measurements that are associated with the plurality of RF signals. The electrical power meter 114 then may provide the electrical power measurements to the controller 118.

Accordingly, the controller 118 may process the electrical power measurements (e.g., by averaging the electrical power measurements) to determine an electrical power associated with each frequency of the plurality of frequencies that are associated with the plurality of RF signals. The controller 118 may process the electrical powers associated with the plurality of frequencies, to determine a plurality of transmission response measurements (e.g., a plurality of electro-optic efficiency over frequency measurements) of the modulator 102, as further described herein.

In some implementations, such as part of a reflection response determination process (e.g., when the electrical power meter 114 is in the second position), the controller 118 may communicate with the RF generator 108 to cause the RF generator 108 to generate a plurality of RF signals (e.g., where each RF signal is associated with a particular frequency in a frequency range) and to provide (e.g., indirectly, such as via the RF coupler 110, and optionally the balun 112) the plurality of RF signals to the modulator 102. The controller 118 may communicate with the electrical power meter 114 to cause the electrical power meter 114 to measure respective electrical powers of portions of the plurality of RF signals that are reflected back from the modulator 102 via the RF coupler 110. Accordingly, the electrical power meter 114 may obtain electrical power measurements of the portions of the plurality of RF signals. The electrical power meter 114 may provide the electrical power measurements to the controller 118. The controller 118 then may determine (e.g., by averaging the electrical power measurements) an electrical power associated with each frequency that is associated with the plurality of RF signals.

The controller 118 may use the determined electrical powers to determine one or more reflection response measurements (e.g., one or more S11 measurements) of the modulator 102. For example, the controller 118 may determine a reflection response measurement for a frequency based on the determined electrical power associated with the frequency. In this way, the controller 118 may determine a reflection response measurement for each frequency that is associated with the plurality of RF signals (e.g., based on the determined electrical power associated with each frequency). For example, for a particular frequency, the controller 118 may compare the electrical power associated with the particular frequency (e.g., an electrical power of a reflected portion of a particular RF signal associated with the particular frequency) and an initial electrical power associated with the particular frequency (e.g., an initial electrical power of the particular RF signal when generated by the RF generator 108) to determine a reflection response measurement of the modulator 102 for the particular frequency.

In some implementations, such as part of a transmission response determination process, the controller 118 may identify an optical transfer function that is associated with the modulator 102 (e.g., based on configuration information associated with the modulator 102, which may be accessible to the controller 118, such as in a data structure of the controller 118). The optical transfer function may identify, for example, a curve that indicates a relationship between an optical power of an output optical signal of the modulator 102 and a bias voltage (sometimes referred to as a drive voltage) that is applied to the modulator 102. Further description regarding the optical transfer function is provided herein in relation to FIG. 3.

The controller 118 may identify a maximum value of the optical transfer function, which may be associated with, for example, a maximum position (e.g., a maximum peak) of the curve of the optical transfer function. The maximum position may be associated with a maximum of a first channel of the modulator 102 (e.g., an I channel of the modulator 102), a minimum of a second channel of the modulator 102 (e.g., a Q channel of the modulator 102), and/or a quadratic term of a phase response (e.g., quad (PH)) of the modulator 102 (this may be referred to as a max (I)-min (Q)-quad (PH) position of the curve of the optical transfer function). Additionally, the controller 118 may identify a minimum value of the optical transfer function, which may be associated with, for example, a minimum position (e.g., a minimum peak) of the curve of the optical transfer function. The minimum position may be associated with a minimum of the first channel of the modulator 102 (e.g., the I channel of the modulator 102), the minimum of the second channel of the modulator 102 (e.g., the Q channel of the modulator 102), and/or the quadratic term of the phase response of the modulator 102 (this may be referred to as a min (I)-min (Q)-quad (PH) position of the curve of the optical transfer function).

Additionally, as part of the transmission response determination process, the controller 118 may cause the modulator 102 to be biased with a particular voltage. For example, the controller 118 may cause the modulator 102 to be biased with a particular voltage that is associated with one of the maximum value or the minimum value of the optical transfer function. In this way, the controller 118 may cause the modulator 102 to be powered for testing (e.g., to determine one or more transmission response measurements of the modulator 102).

Further, as part of the transmission response determination process, the controller 118 may communicate with the RF generator 108 to cause the RF generator to generate a plurality of RF signals that are associated with a plurality of frequencies and to provide (e.g., directly, or indirectly, such as via the RF coupler 110, the balun 112, and/or the testing component 106) the plurality of RF signals to the modulator 102 (e.g., to at least the first channel of the modulator 102). Additionally, the modulator 102 may receive an input optical signal (e.g., from an optical signal source, which may, or may not, be included in the testing system 104) and may therefore modulate the input optical signal based on the plurality of RF signals to create an output optical signal (e.g., that is modulated in association with the plurality of frequencies that are associated with the plurality of RF signals) that is emitted by the modulator 102.

The controller 118 may communicate with the optical power meter 116 to cause the optical power meter 116 to measure an optical power of the output optical signal one or more times while the output optical signal is modulated (or attempted to be modulated) by the modulator 102 in association with a particular RF signal, such as during a time window. The time window may be less than or equal to 1 second, 2 seconds, 3 seconds, 5 seconds, 10 seconds, 15 seconds, 20 seconds, 25 seconds, 30 seconds, or 1 minute, among other examples. Accordingly, the optical power meter 116 may obtain one or more optical power measurements associated with the particular RF signal during the time window. In this way, the optical power meter 116 may obtain one or more optical power measurements respectively associated with the plurality of RF signals, which the optical power meter 116 may provide to the controller 118.

The controller 118 may process the one or more optical power measurements (e.g., average the one or more optical power measurements) respectively associated with the plurality of RF signals to determine respective optical powers (e.g., respective average optical powers) associated with the plurality of RF signals. Accordingly, the controller 118 may thereby determine an optical power (e.g., an average optical power) associated with each frequency of the plurality of frequencies that are associated with the plurality of RF signals.

Accordingly, the controller 118 may process the optical powers associated with the plurality of frequencies to determine a plurality of transmission response measurements (e.g., a plurality of electro-optic efficiency over frequency measurements) of the modulator 102 that are associated with the plurality of frequencies. For example, for a particular frequency, the controller 118 may process (e.g., based on the maximum value of the optical transfer function of the modulator 102) the optical power associated with the particular frequency to determine a normalized optical power associated with the particular frequency. The controller 118 may determine, based on the normalized optical power for the particular frequency and, in some implementations, based on an electrical power measurement associated with the particular frequency (e.g., that was determined by the controller 118 as part of the calibration process described herein), to determine a transmission response measurement of the modulator 102 for the particular frequency. For example, the controller may process, based on the optical transaction function of the modulator 102, the normalized optical power for the particular frequency and the electrical power measurement associated with the particular frequency (e.g., using a deconvoluting technique, or a similar technique) to determine the transmission response measurement of the modulator 102 for the particular frequency.

As indicated above, FIG. 1 is provided as an example. Other examples may differ from what is described with regard to FIG. 1.

Figure 2:
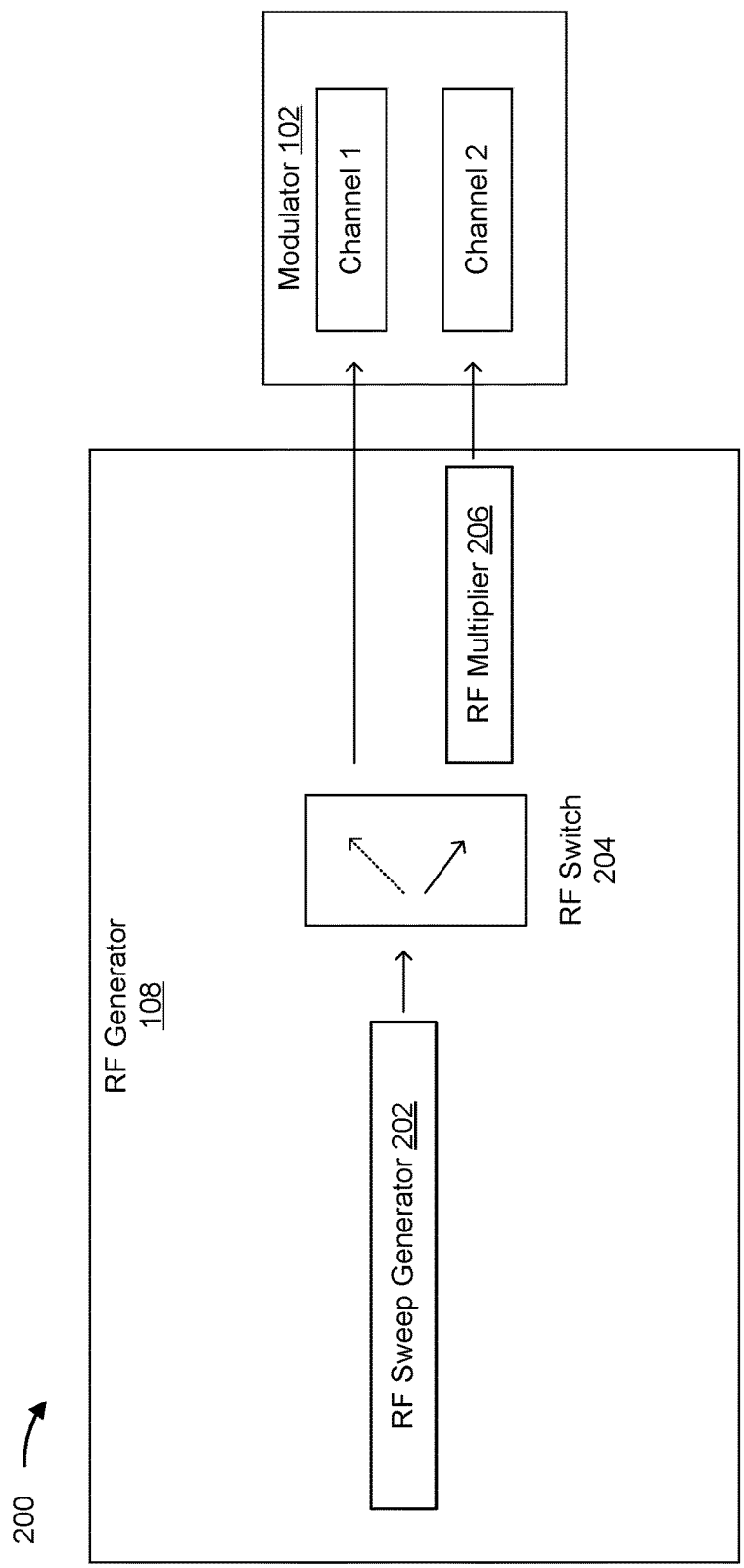
FIG. 2 is a diagram of an example implementation of an RF generator described herein.

FIG. 2 is a diagram of an example implementation 200 of an RF generator 108. As shown in FIG. 2, the RF generator 108 may include an RF sweep generator 202, an RF switch 204, and/or an RF multiplier 206.

As described herein in relation to FIG. 1, the RF generator 108 may be configured to generate a plurality of RF signals (e.g., serially, such that a first RF signal is generated, and then a second RF signal is generated, and then a third RF signal is generated, and so on), which may be associated with a first frequency range (e.g., that is from a minimum frequency to a first maximum frequency). To do so, the RF generator 108 may include the RF sweep generator 202, which may be configured to generate another plurality of RF signals (e.g., serially) that are associated with a second frequency range (e.g., that is from the minimum frequency to a second maximum frequency). In some implementations, the first frequency range may match the second frequency range (e.g., the first maximum frequency is the same as the second maximum frequency). Accordingly, the RF generator 108 may include the RF sweep generator 202, and not the RF multiplier 206. Alternatively, the first frequency range may not match the second frequency range (e.g., the first maximum frequency is greater than the second maximum frequency). Accordingly, the RF generator 108 may include the RF multiplier 206 (e.g., to enable generation of RF signals with signals that are greater than the first maximum frequency, as described herein).

The RF switch 204 may be configured to allow RF signals generated by the RF sweep generator 202 to be provided as an output of the RF generator 108. For example, as shown in FIG. 2, the RF switch 204, when in a first position, may allow the other plurality of RF signals that are associated with the second frequency range to be provided as an output of the RF generator 108. Additionally, or alternatively, the RF switch 204 may be configured to allow RF signals generated by the RF sweep generator 202 to be provided to the RF multiplier 206. For example, as shown in FIG. 2, the RF switch 204, when in a second position, may allow one or more other RF signals (e.g., that are different than the other plurality of RF signals) to be provided to the RF multiplier 206. The one or more other RF signals may be associated with the second frequency range, or a subrange of the second frequency range. The RF switch 204 may be adjusted between the first position and the second position based on manual input (e.g., by a human operator), or based on communicating with the controller 118, as described herein.

The RF multiplier 206 may be configured to receive the one or more other RF signals (e.g., when the RF switch is in the second position) and to generate, based on the one or more other RF signals, one or more multiplied RF signals. The one or more multiplied RF signals may be associated with a third frequency range (e.g., that is from the second maximum frequency to the first maximum frequency).

Accordingly, the RF multiplier 206 may be configured to provide the one or more multiplied RF signals as an output of the RF generator 108.

In this way, when the RF sweep generator 202 is unable to generate RF signals that are associated with high frequencies of the first frequency range (e.g., that are greater than the second maximum frequency), the RF generator 108 may further include the RF multiplier 206 that is able to generate (e.g., based on lower frequency RF signals) RF signals that are associated with the high frequencies of the first frequency range. Accordingly, the RF sweep generator 202 may generate and provide the other plurality of RF signals that are associated with the second frequency range, and the RF multiplier 206 may generate and provide the one or more multiplied RF signals that associated with the third frequency range. Therefore, the RF sweep generator 202 may generate and provide a plurality of RF signals associated with the first frequency range (e.g., because the second frequency range and the third frequency range cover the first frequency range).

As further shown in FIG. 2, the RF switch 204 may allow (e.g., when in the first position) the other plurality of RF signals to be provided to a first channel of the modulator 102 (e.g., to enable testing of the first channel with respect to the second frequency range), and may allow (e.g., when in the second position) the one or more multiplied RF signals to be provided to a second channel of the modulator 102 (e.g., to enable testing of the second channel with respect to the third frequency range). Accordingly, the outputs of the RF generator 108 may then be physically switched (e.g., between the first channel and the second channel). The RF switch 204 may then allow (e.g., when in the first position) the other plurality of RF signals to be provided to the second channel of the modulator 102 (e.g., to enable testing of the second channel with respect to the second frequency range), and may allow (e.g., when in the second position) the one or more multiplied RF signals to be provided to the first channel of the modulator 102 (e.g., to enable testing of the first channel with respect to the third frequency range). In this way, both channels may be tested with respect to the first frequency range, such that outputs of the RF generator 108 only need to be switched once.

In some implementations, when the controller 118 communicates with the RF generator 108 to cause the RF generator 108 to generate and provide the plurality of RF signals associated with the first frequency range, the controller 118 may communicate with the RF sweep generator 202, the RF switch 204, and/or the RF multiplier 206. For example, the controller 118 may communicate with the RF sweep generator 202 to cause the RF sweep generator 202 to generate and provide the other plurality of RF signals that are associated with the second frequency range and/or the one or more other RF signals that are associated with the second frequency range (or a subrange of the second frequency range); may communicate with the RF switch 204 to cause the RF switch 204 to move to (or remain in) the first position or the second position; and/or may communicate with the RF multiplier 206 to generate and provide the one or more multiplied RF signals that are associated with the third frequency range.

As indicated above, FIG. 2 is provided as an example. Other examples may differ from what is described with regard to FIG. 2.

Figure 3:
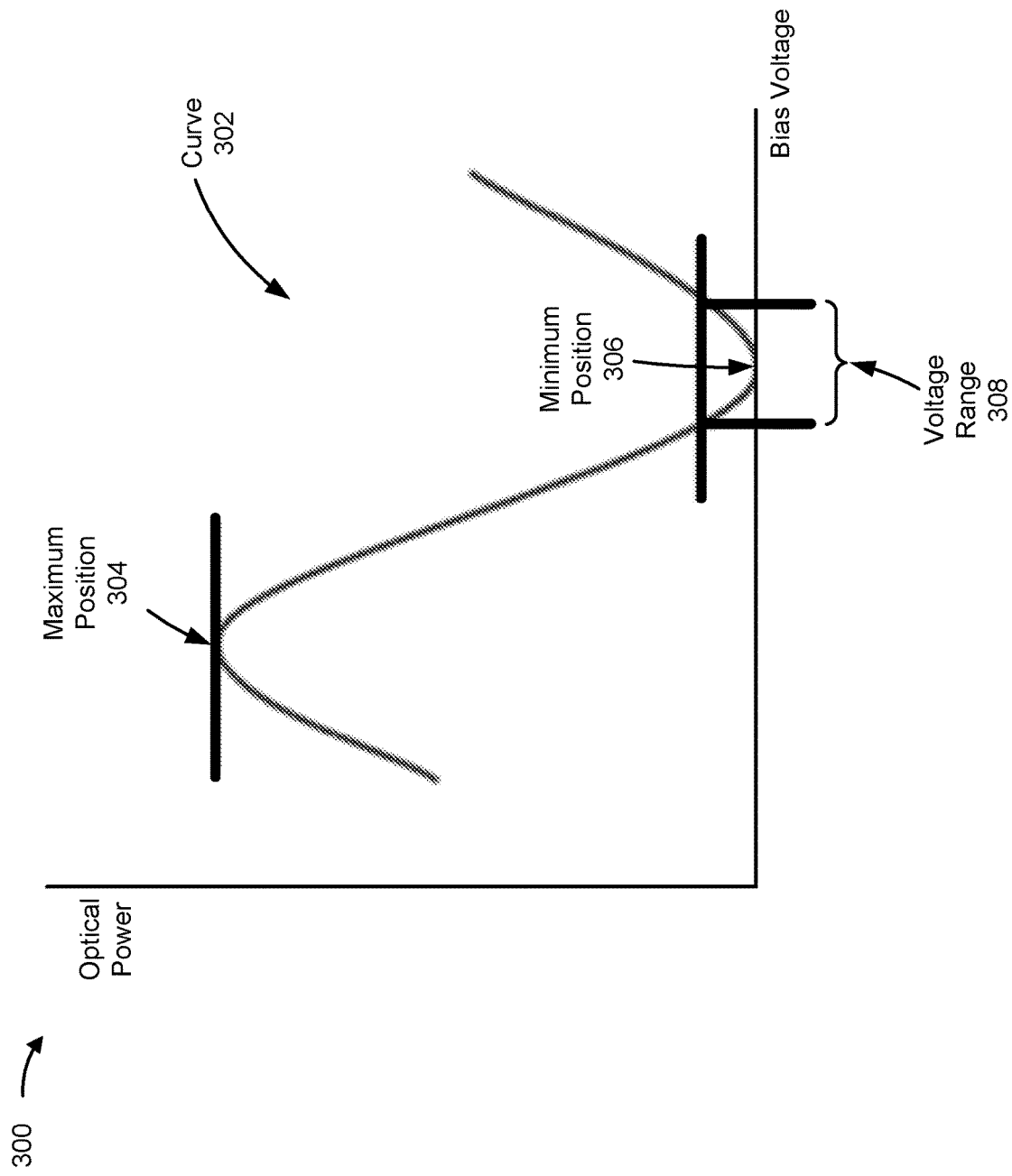
FIG. 3 is a plot of an example curve of an optical transfer function that is associated with a modulator described herein.

FIG. 3 is a plot 300 of an example curve 302 of an optical transfer function that is associated with the modulator 102. The curve 302 may indicate a relationship between an optical power of an output optical signal of the modulator 102 and a bias voltage (sometimes referred to as a drive voltage) that is applied to the modulator 102.

As shown in FIG. 3, the curve 302 may include a maximum position 304 (e.g., a maximum peak) and a minimum position 306 (e.g., a minimum peak). In some implementations, the controller 118 may cause the modulator 102 to be biased with a particular voltage that is associated with one of the maximum position 304 or the minimum position 306. For example, the controller 118 may cause the modulator 102 to be biased with a particular voltage that is associated with the minimum position 306, which may be within the voltage range 308 shown in FIG. 3. In this way, the controller 118 may cause the modulator 102 to be powered for testing (e.g., to determine one or more transmission response measurements of the modulator 102), as described elsewhere herein.

As indicated above, FIG. 3 is provided as an example. Other examples may differ from what is described with regard to FIG. 3.

Figure 4:
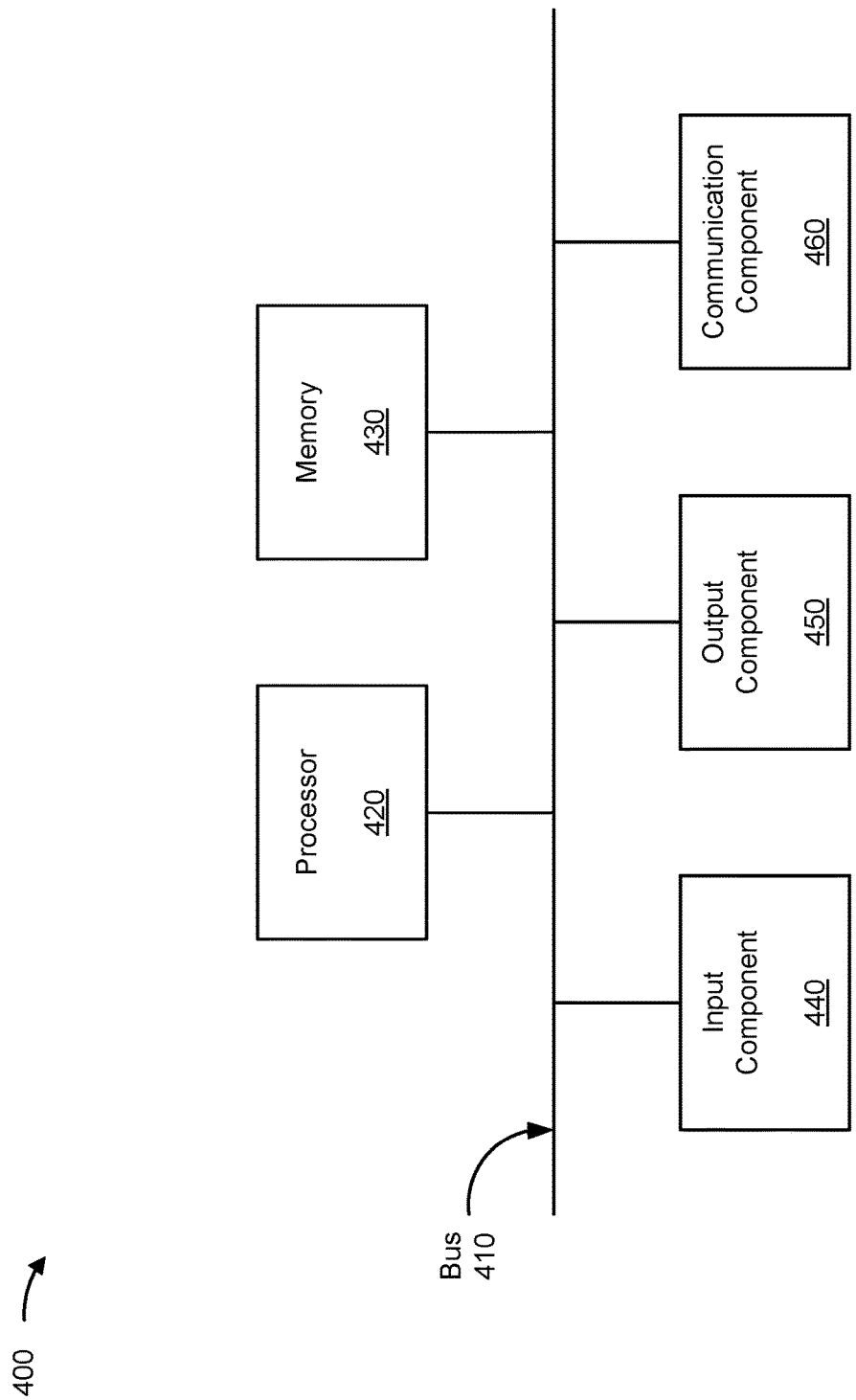
FIG. 4 is a diagram of example components of a device associated with a testing system for high-frequency modulators.

FIG. 4 is a diagram of example components of a device 400 associated with a testing system for high-frequency modulators. The device 400 may correspond to one or more components of the testing system 104, such as the RF generator 108, the electrical power meter 114, the optical power meter 116, the controller 118, the RF sweep generator 202, the RF switch 204, and/or the RF multiplier 206. In some implementations, the testing system 104, such as the RF generator 108, the electrical power meter 114, the optical power meter 116, the controller 118, the RF sweep generator 202, the RF switch 204, and/or the RF multiplier 206 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
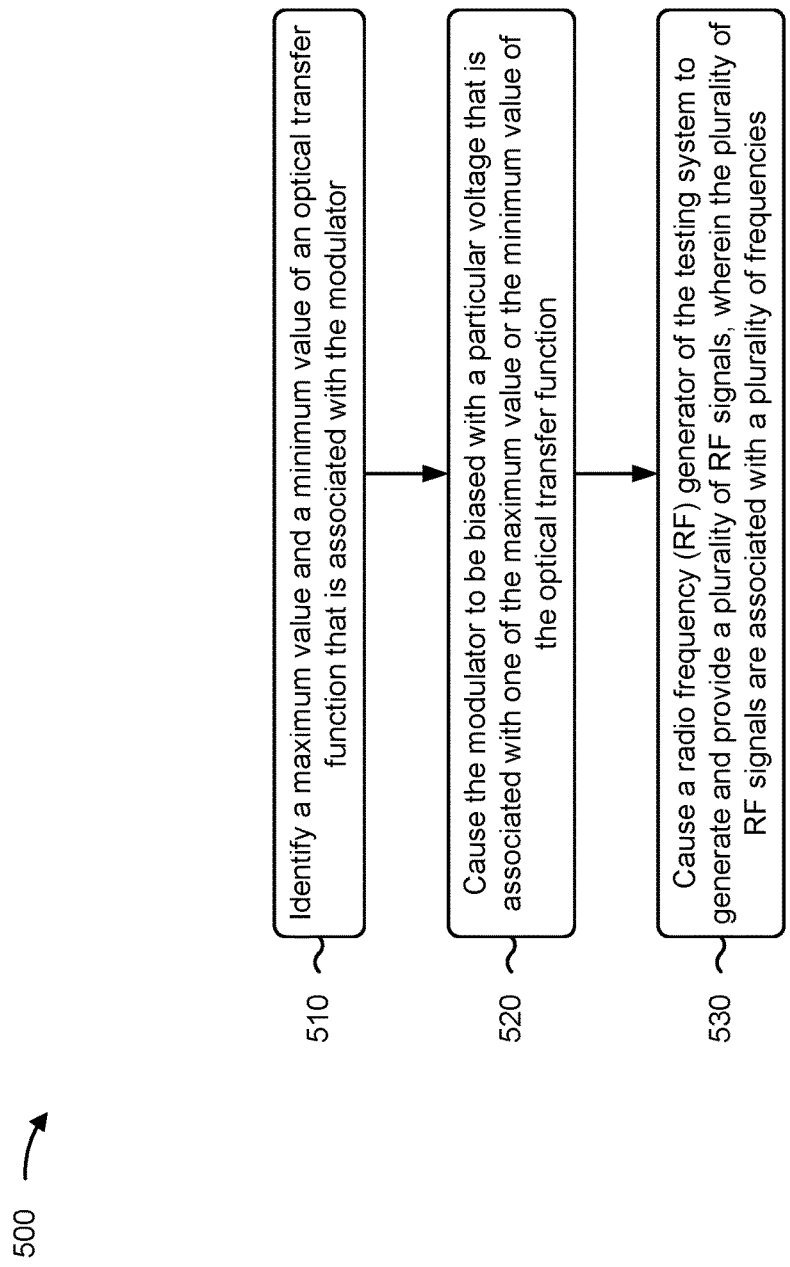
FIG. 5 is a flowchart of an example process associated with a testing system for high-frequency modulators.

FIG. 5 is a flowchart of an example process 500 associated with a testing system for high-frequency modulators. In some implementations, one or more process blocks of FIG. 5 are performed by a controller (e.g., the controller 118) of a testing system (e.g., the testing system 104) for a modulator (e.g., the modulator 102). In some implementations, one or more process blocks of FIG. 5 are performed by another device or a group of devices separate from or including the controller, such as an RF generator (e.g., the RF generator 108), an electrical power meter (e.g., the electrical power meter 114), an optical power meter (e.g., the optical power meter 116), an RF sweep generator (e.g., the RF sweep generator 202), an RF switch (e.g., the RF switch 204), and/or an RF multiplier (e.g., the RF multiplier 206). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include identifying a maximum value and a minimum value of an optical transfer function that is associated with the modulator (block 510). For example, the controller may identify a maximum value and a minimum value of an optical transfer function that is associated with the modulator, as described above.

As further shown in FIG. 5, process 500 may include causing the modulator to be biased with a particular voltage that is associated with one of the maximum value or the minimum value of the optical transfer function (block 520). For example, the controller may cause the modulator to be biased with a particular voltage that is associated with one of the maximum value or the minimum value of the optical transfer function, as described above.

As further shown in FIG. 5, process 500 may include causing an RF generator of the testing system to generate and provide a plurality of RF signals, wherein the plurality of RF signals are associated with a plurality of frequencies (block 530). For example, the controller may cause an RF generator of the testing system to generate and provide a plurality of RF signals, wherein the plurality of RF signals are associated with a plurality of frequencies, as described above.

Process 500 may include additional implementations, such as any single implementation or any combination of implementations described below and/or in connection with one or more other processes described elsewhere herein.

In a first implementation, the plurality of frequencies are associated with a frequency range that includes a maximum frequency that is greater than or equal to 70 gigahertz.

In a second implementation, process 500 includes causing an optical power meter of the testing system to measure an optical power of an output optical signal emitted by the modulator, wherein the output optical signal is modulated by the modulator based on the plurality of frequencies; receiving, from the optical power meter, one or more optical power measurements associated with each frequency of the plurality of frequencies; determining, based on the one or more optical power measurements associated with each frequency of the plurality of frequencies, an average optical power associated with each frequency of the plurality of frequencies; and determining, based on the average optical power associated with each frequency of the plurality of frequencies, a transmission response measurement of the modulator for each frequency of the plurality of frequencies.

In a third implementation, determining the transmission response measurement of the modulator for each frequency of the plurality of frequencies comprises processing, based on the maximum value of the optical transfer function, the average optical power associated with each frequency of the plurality of frequencies to determine a normalized average optical power associated with each frequency of the plurality of frequencies; and determining, based on the optical transfer function and the normalized average optical power associated with each frequency of the plurality of frequencies, the transmission response measurement of the modulator for each frequency of the plurality of frequencies.

In a fourth implementation, the transmission response measurement of the modulator for each frequency of the plurality of frequencies is an electro-optic efficiency over frequency measurement.

In a fifth implementation, process 500 includes causing an electrical power meter of the testing system to measure a portion of each RF signal of the plurality of RF signals; receiving, from the electrical power meter, electrical power measurements that are associated with the plurality of RF signals; and determining, based on the electrical power measurements that are associated with the plurality of RF signals, an electrical power associated with each frequency of the plurality of frequencies.

In a sixth implementation, process 500 includes determining, based on the electrical power associated with each frequency of the plurality of frequencies, a reflectance response measurement of the modulator for each frequency of the plurality of frequencies.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A testing system to test a modulator, comprising:
   a radio frequency (RF) generator;
   an optical power meter; and
   a controller, wherein:
      the RF generator is configured to generate and provide a plurality of RF signals,
         wherein the plurality of RF signals are associated with a plurality of frequencies,
      the optical power meter is configured to measure an optical power of an output optical signal emitted by the modulator,
         wherein the output optical signal is modulated by the modulator based on the plurality of frequencies,
      the optical power meter is configured to provide, based on measuring the optical power of the output optical signal, one or more optical power measurements associated with each frequency of the plurality of frequencies, and
      the controller is configured to:
         determine, based on the one or more optical power measurements associated with each frequency of the plurality of frequencies, an average optical power associated with each frequency of the plurality of frequencies, and
         determine, based on the average optical power associated with each frequency of the plurality of frequencies, a transmission response measurement of the modulator for each frequency of the plurality of frequencies.

2. The testing system of claim 1, wherein the plurality of frequencies are associated with a frequency range that includes a maximum frequency that is greater than or equal to 70 gigahertz.

3. The testing system of claim 1, wherein the RF generator includes:
   an RF sweep generator,
   an RF switch, and
   an RF multiplier.

4. The testing system of claim 1, wherein the testing system further includes an electrical power meter, and wherein the plurality of RF signals are generated and provided as part of a first process, wherein:
   the RF generator is further configured to generate and provide, as part of a second process that is different than the first process, another plurality of RF signals that are associated with the plurality of frequencies; and
   the electrical power meter is configured to measure a portion of each RF signal of the other plurality of RF signals.

5. The testing system of claim 4, wherein the electrical power meter is further configured to measure the portion of each RF signal, of the other plurality of RF signals, at an input of a testing component that holds the modulator.

6. The testing system of claim 4, wherein the testing system further includes an RF coupler,
   wherein the electrical power meter is further configured to measure the portion of each RF signal, of the other plurality of RF signals, at an input of the RF coupler.

7. The testing system of claim 6, wherein the controller is further configured to:
   determine, based on electrical power measurements of the portions of the other plurality of RF signals provided by the electrical power meter, an electrical power associated with each frequency of the plurality of frequencies; and
   determine, based on the electrical power associated with each frequency of the plurality of frequencies, a reflectance response measurement of each frequency.

8. The testing system of claim 1, wherein the testing system further includes a balun that is configured to convert each RF signal, of the plurality of RF signals, from a single-ended RF signal to a differential RF signal.

9. A testing system, comprising:
a testing component configured to hold a modulator;
a radio frequency (RF) generator;
an optical power meter; and
an electrical power meter, wherein:
the RF generator is configured to generate and provide a first plurality of RF signals in association with a first process,
wherein the first plurality of RF signals are associated with a plurality of frequencies,
the optical power meter is configured to measure an optical power of an output optical signal emitted by the modulator,
wherein the output optical signal is modulated by the modulator based on the plurality of frequencies,
the RF generator is configured to generate and provide a second plurality of RF signals in association with a second process,
wherein the second plurality of RF signals are associated with a plurality of frequencies, and
the electrical power meter is configured to measure a portion of each RF signal of the second plurality of RF signals.

10. The testing system of claim 9, wherein the plurality of frequencies are associated with a frequency range that includes a maximum frequency that is greater than or equal to 70 gigahertz.

11. The testing system of claim 9, wherein the RF generator includes:
an RF sweep generator,
an RF switch, and
an RF multiplier.

12. The testing system of claim 9, wherein the electrical power meter is further configured to measure the portion of each RF signal, of the second plurality of RF signals, at an input of the testing component.

13. The testing system of claim 9, wherein the testing system further includes an RF coupler, and
wherein the electrical power meter is further configured to measure the portion of each RF signal, of the second plurality of RF signals, at an input of the RF coupler.

14. A method, comprising:
identifying, by a controller of a testing system for a modulator, a maximum value and a minimum value of an optical transfer function that is associated with the modulator;
causing, by the controller, the modulator to be biased with a particular voltage that is associated with one of the maximum value or the minimum value of the optical transfer function; and
causing, by the controller, a radio frequency (RF) generator of the testing system to generate and provide a plurality of RF signals,
wherein the plurality of RF signals are associated with a plurality of frequencies.

15. The method of claim 14, wherein the plurality of frequencies are associated with a frequency range that includes a maximum frequency that is greater than or equal to 70 gigahertz.

16. The method of claim 14, further comprising:
causing an optical power meter of the testing system to measure an optical power of an output optical signal emitted by the modulator,
wherein the output optical signal is modulated by the modulator based on the plurality of frequencies;
receiving, from the optical power meter, one or more optical power measurements associated with each frequency of the plurality of frequencies;
determining, based on the one or more optical power measurements associated with each frequency of the plurality of frequencies, an average optical power associated with each frequency of the plurality of frequencies; and
determining, based on the average optical power associated with each frequency of the plurality of frequencies, a transmission response measurement of the modulator for each frequency of the plurality of frequencies.

17. The method of claim 16, wherein determining the transmission response measurement of the modulator for each frequency of the plurality of frequencies comprises:
processing, based on the maximum value of the optical transfer function, the average optical power associated with each frequency of the plurality of frequencies to determine a normalized average optical power associated with each frequency of the plurality of frequencies; and
determining, based on the optical transfer function and the normalized average optical power associated with each frequency of the plurality of frequencies, the transmission response measurement of the modulator for each frequency of the plurality of frequencies.

18. The method of claim 16, wherein the transmission response measurement of the modulator for each frequency of the plurality of frequencies is an electro-optic efficiency over frequency measurement.

19. The method of claim 14, further comprising:
causing an electrical power meter of the testing system to measure a portion of each RF signal of the plurality of RF signals;
receiving, from the electrical power meter, electrical power measurements that are associated with the plurality of RF signals; and
determining, based on the electrical power measurements that are associated with the plurality of RF signals, an electrical power associated with each frequency of the plurality of frequencies.

20. The method of claim 19, further comprising:
determining, based on the electrical power associated with each frequency of the plurality of frequencies, a reflectance response measurement of the modulator for each frequency of the plurality of frequencies.

* * * * *